United States Patent [19]

Kraemer

[11] 4,214,847

[45] Jul. 29, 1980

[54] INSERT FOR RAILROAD TOOLS

[75] Inventor: Rolf H. Kraemer, Gurnee, Ill.

[73] Assignee: Fansteel Inc., North Chicago, Ill.

[21] Appl. No.: 969,462

[22] Filed: Dec. 14, 1978

[51] Int. Cl.² ............................................. B26D 1/00
[52] U.S. Cl. .................................... 407/114; 407/116
[58] Field of Search .................. 407/114, 116, 107, 66

[56] References Cited

U.S. PATENT DOCUMENTS

| 3,344,496 | 10/1967 | Patkay | 407/114 |
| 3,557,416 | 1/1971 | Jones | 407/114 |
| 3,885,281 | 5/1975 | Stambler | 407/114 |
| 3,973,308 | 8/1976 | Lundgren | 407/114 |
| 3,975,809 | 8/1976 | Sorice et al. | 407/114 |

*Primary Examiner*—Leonidas Vlachos
*Attorney, Agent, or Firm*—Barnes, Kisselle, Raisch & Choate

[57] ABSTRACT

A finishing tool for resurfacing railroad axles which incorporates a flat diamond-shaped insert with a short chip indentation in the flat top surface near the cutting corner and adjacent one side to control cuttings.

2 Claims, 4 Drawing Figures

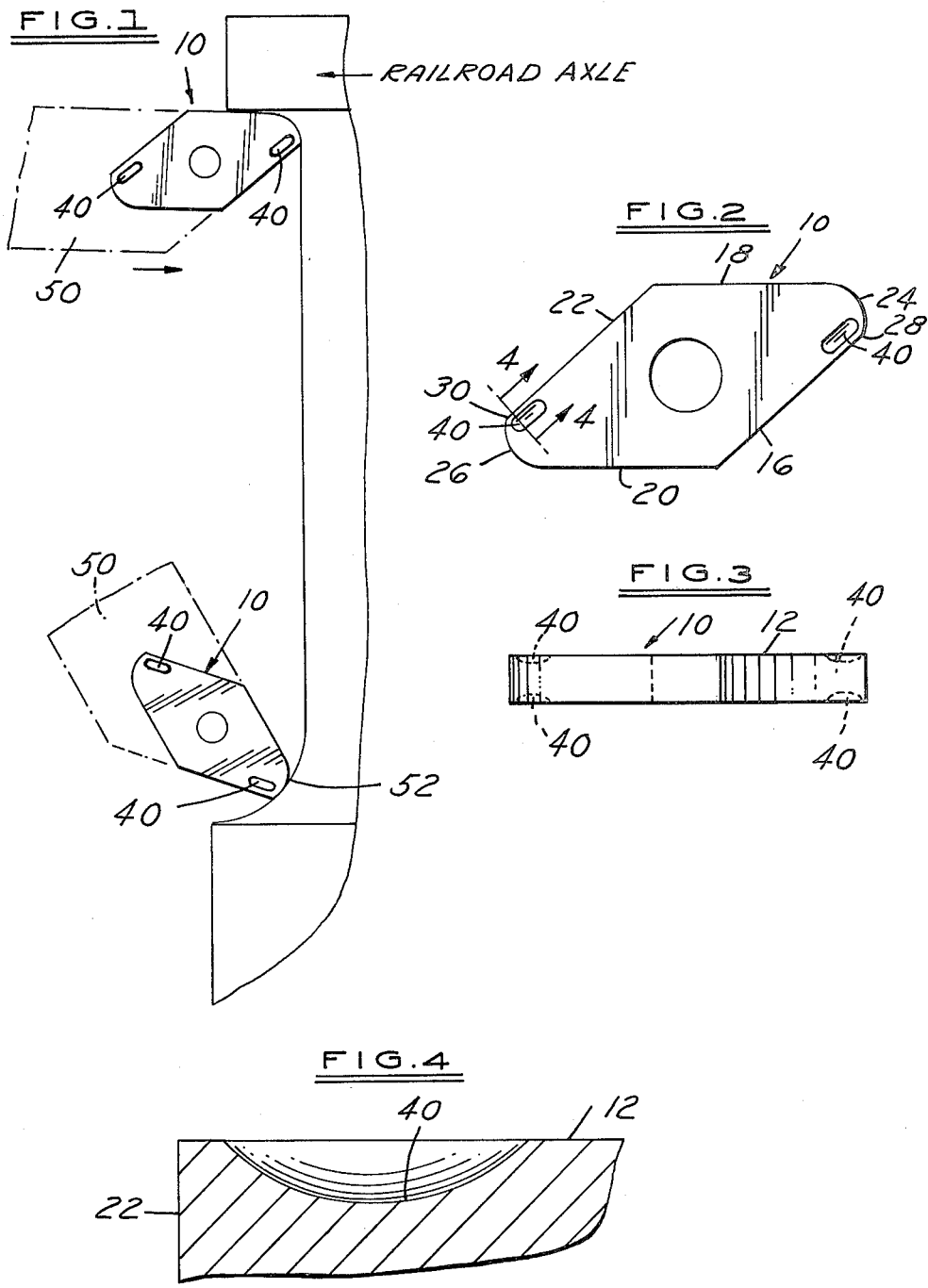

INSERT FOR RAILROAD TOOLS

FIELD OF THE INVENTION

Indexable throwaway inserts for tool holders used for resurfacing used journal (bearing) surfaces on friction-bearing type railroad axles.

BACKGROUND AND OBJECTS OF THE INVENTION

Railroad car axles are frequently used over a period of time and then brought into the shop to be reconditioned. Part of this reconditioning involves machining a bearing area which has been journalled in a suitable bearing box. The wear and work hardening of the bearing surface provides a difficult machining operation when the outer surface is to be machined away to restore this portion of the axle to provide a round, smooth bearing surface.

It is, therefore, an object of the present invention to provide a relatively simple cutting insert for railroad axles and the like which will stand up for long periods of time and produce chips which are short and easily handled and safe for the machine operator.

The invention involves the use of a diamond-shaped insert with a simple, shallow elongate groove adjacent a cutting corner having a flat, strong land at the cutting area of the insert.

Previous United States patents, such as Wirfelt U.S. Pat. No. 3,395,434, Wirfelt U.S. Pat. No. 3,407,467 and Stambler U.S. Pat. No. 3,885,281, have disclosed composite chip control grooves utilizing pockets or depressions within grooves. The present invention contemplates a simplified construction which has greater strength and longer life and thus requires few changes in a working shift.

Other objects and features of the invention will be apparent in the following description and claims in which the principles of the invention are set forth together with details on how to practice the invention, all in connection with the best mode presently contemplated for the invention.

DESCRIPTION OF THE DRAWINGS

DRAWINGS accompany the disclosure and the various views thereof may be briefly described as follows:

FIG. 1, a schematic illustration of tool holders and inserts in relation to a workpiece.

FIG. 2, a plan view of an insert.

FIG. 3, a side view of the insert of FIG. 2.

FIG. 4, a partial enlarged section on line 4—4 of FIG. 2.

REFERRING TO THE DRAWINGS, in FIGS. 1, 2 and 3, a flat wafer-like insert 10 has top and bottom surfaces 12 and 14 and a diamond shape with side edges perpendicular to the top and bottom surfaces. Straight sides 16 and 18 converge toward a rounded nose portion 24 while sides 20 and 22 converge toward a nose portion 26, the nose portions being at the ends of the diamond having the smaller angles.

Side 16 interrupts the curvature of the nose 24 at 28 while side 22 interrupts the curvature of the nose 26 at 30. A central hole 32 can be used to lock the insert into a pin type holder or a top clamp may be utilized to hold the insert. The cutting corners 28 and 30 are formed with a small radius ranging from 0.003 to 0.007 inches, typically about 0.005 inches.

A narrow, shallow and rather short chip groove 40 is impressed into the flat top and bottom surfaces of the insert 10 originating at each end just behind the nose portion 24 and extending parallel to but spaced from the respective edges 16 and 22. The groove is relatively short, about one-fifth (1/5) the length of the side to which it is related, and has a configuration, as shown in FIG. 4, of a portion of a circular arc.

The groove depth at the deepest part is preferably between 0.010 and 0.015 inches and its length is preferably about 0.125 inches as illustrated in the embodiment shown for an insert 1⅜ inches in length and 11/16 inches wide. The groove originates about 0.003 to 0.008 inches from the nose surface and is spaced from the related sides about 0.003 to 0.008 inches. This leaves a strong flat land at the cutting edge which is reinforced, fore and aft.

Inserts 10 are made of a hard cutting material such as cemented tungsten carbide. Inserts of Code C-7 tungsten carbide of the U.S. Industry Classification System, such as the grade VR-73 carbide produced by the VR/Wesson Division of Fansteel Inc., and having an exterior coating of titanium carbide of 3 to 7 microns, typically about 5 microns in thickness have been found to be highly satisfactory. Such C-7 type inserts coated with a similar thickness of aluminum oxide instead of titanium carbide also have performed well. The U.S. Industry Classification System is published in *World Directory and Handbook of Hard Metals* by Kenneth J. A. Brookes, *Engineers Digest*, 1975.

In actual use, the insert described was successfully utilized on one corner only for an entire 8 hour shift in comparison with 2 to 3 hours for state-of-the-art inserts. Short tightly wound chips resulted in comparison to long stringy chips which are dangerous to an operator.

FIG. 1 illustrates the manner of use of the insert. A tool holder 50 is provided in which the insert 10 is mounted by a suitable screw or clamp. A plunge cut is made first, as shown at the top of FIG. 1, and the insert is then traversed along the axle to remove, for example, 0.020″ of stock. When the radius 52 is reached at the bottom end of the cut as viewed in FIG. 1, the tool 50 is tilted so the cutting portion of the insert adjacent the chip breaker groove effectively completes the radius of the journal.

It will thus be seen that the essentially flat diamond-shaped insert has the short, top-surface indentation spaced from the nose and the side to provide just enough chip control for the cuts to be taken that proper short chips are obtained. Meanwhile, the cutting edges remain strong and durable.

It will be appreciated that the indentations 40 may be provided in both the flat surfaces of the insert as shown in FIG. 3 so that the insert may be indexed four times before it becomes expendable. The short dimensions of the indentations leave a flat surface on the insert uninterrupted except for the corner grooves. This insures a flat solid contact with support for each cutting corner. When the indentations are provided on both sides of the insert, the corners 28 and 30 will also be provided on both sides of the radiused nose portions 24 and 26.

I claim:

1. A cutting insert for light duty machining of railroad axles and the like which comprises a flat, wafer-like, insert body having a substantially diamond shape with flat, parallel, upper and lower surfaces joined by side edges perpendicular to said surfaces, and a rounded nose portion connecting the sides merging toward the low angle corners of the diamond shape, and a shallow, elongate, narrow chip breaker groove formed into at least one of the flat surfaces of said insert originating inside said nose portion and extending along one side of said insert away from said nose portion and parallel to but spaced from a straight side diverging from said nose portion to leave a flat land between said groove and said one side, said groove extending from said nose portion along said side about one-fifth the length of said side.

2. A cutting insert as defined in claim 1 in which said groove has a cross-sectional configuration in the form of a portion of a circular arc.

* * * * *